(12) United States Patent
Baum et al.

(10) Patent No.: US 9,963,381 B2
(45) Date of Patent: May 8, 2018

(54) METHOD FOR FINISHING A GLASS PRODUCT AND GLASS PRODUCT

(71) Applicant: Infineon Technologies AG, Neubiberg (DE)

(72) Inventors: David Baum, Klagenfurt (AT); Kurt Sorschag, Landskron (AT); Martin Kulterer, Kagenfurt (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 220 days.

(21) Appl. No.: 14/808,965

(22) Filed: Jul. 24, 2015

(65) Prior Publication Data
US 2017/0022095 A1 Jan. 26, 2017

(51) Int. Cl.
| | |
|---|---|
| *C03C 15/00* | (2006.01) |
| *C03C 23/00* | (2006.01) |
| *C03C 25/60* | (2018.01) |
| *C03C 25/68* | (2006.01) |
| *C03C 21/00* | (2006.01) |
| *C03C 25/70* | (2006.01) |

(52) U.S. Cl.
CPC .............. *C03C 15/00* (2013.01); *C03C 21/00* (2013.01); *C03C 21/001* (2013.01); *C03C 23/00* (2013.01); *C03C 23/0075* (2013.01); *C03C 25/60* (2013.01); *C03C 25/68* (2013.01); *C03C 25/70* (2013.01); *C03C 2218/31* (2013.01); *C03C 2218/34* (2013.01)

(58) Field of Classification Search
None
See application file for complete search history.

(56) References Cited

U.S. PATENT DOCUMENTS 3,782,915 A * 1/1974 Filbert et al. ........... C03C 11/00
216/80

FOREIGN PATENT DOCUMENTS

WO 2014139984 A1 9/2014

OTHER PUBLICATIONS

Kvakovszky, G., et al., "A Review of Microelectronic Manufacturing Applications Using DMSO-Based Chemstries," ECS Transcations, vol. 11, Issue 2, Jan. 1, 2007, pp. 227-234.

* cited by examiner

*Primary Examiner* — Jiong-Ping Lu
(74) *Attorney, Agent, or Firm* — Slater Matsil, LLP

(57) ABSTRACT

Embodiments of the present invention provide a method for finishing a glass product including a glass layer, the glass layer comprising boron. The method includes the step of cleaning the glass layer in order to remove boron at least at the surface of the glass layer. The step of cleaning includes the substep of esterification using a medium comprising an alcohol.

19 Claims, 3 Drawing Sheets

FIG 1
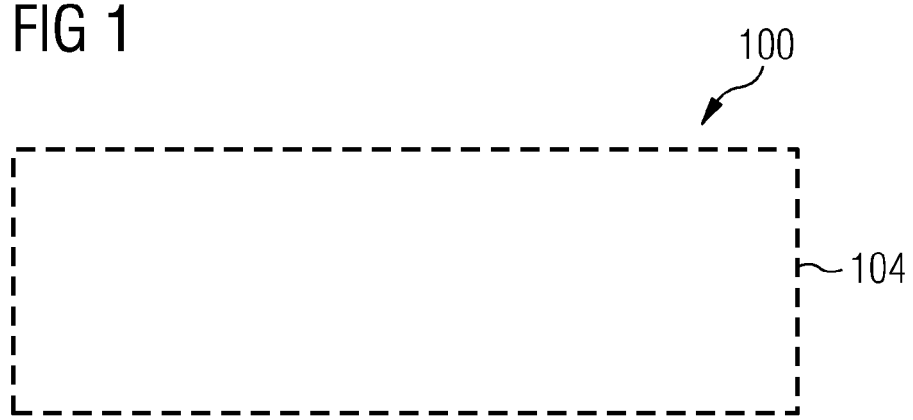
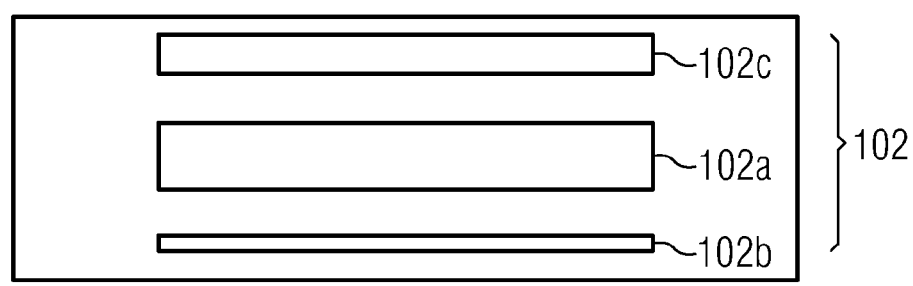
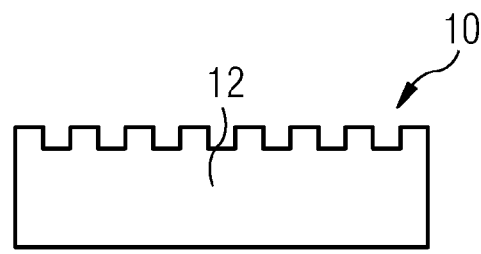
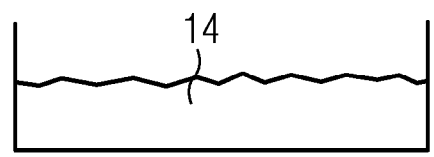
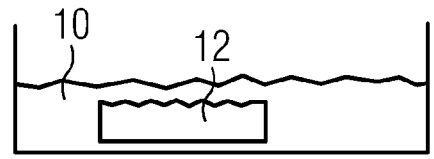

METHOD FOR FINISHING A GLASS PRODUCT AND GLASS PRODUCT

TECHNICAL FIELD

Embodiments of the present invention refer to a method for finishing a glass product, to a method for manufacturing a glass substrate and to a glass product itself.

BACKGROUND

Glasses may be classified with regard to their ingredients. A basic distinction may be made between organic and inorganic glasses. The group of inorganic glasses comprises quartz glasses, soda-lime-silica glasses (classic window glass) sodium borosilicate glasses, lead-oxide glasses, aluminum silicate glasses and oxide glasses. Some of these glasses, especially the sodium borosilicate glasses and the aluminum silicate glasses may comprise boron, e.g., in form of boric oxide ($B_2O_3$).

Application for borosilicate glass may be health and science, electronics, cookware, lightening, optics or others. Especially for applications, like electronics (MEMS devices, LABS devices or other electronic devices having at least a boric layer or a boron phosphor silicate layer), the boron may cause some drawbacks. Therefore, there is a need for an improved approach.

SUMMARY

Embodiments of the invention provide a method for finishing a glass product comprising a glass layer, and a glass layer comprising boron. The method comprises the step of cleaning the glass layer in order to remove boron at least at a surface of a glass layer. The step of cleaning comprises the substep of esterification using a medium comprising an alcohol.

A further embodiment provides method for manufacturing a glass substrate, the glass substrate comprises boron. The method comprises the steps of structuring and cleaning the glass substrate. The structure comprises the substep of lithography. The cleaning has the purpose to remove boron at a nearest surface of the glass substrate up to a depth of 100 nm of the glass substrate, wherein the step of cleaning comprises the substep of esterification using a medium comprising more than 80% of MeOH and less than 5% of $H_2SO_4$.

A further embodiment of the present invention provides a glass product comprising a glass layer. Here, a boric concentration at a near surface of the glass layer up to a depth of 100 nm is at least four times smaller when compared to the boric concentration at a core of the glass layer.

BRIEF DESCRIPTION OF THE DRAWINGS

Embodiments of the present invention will be discussed referring to the enclosed figures, wherein:

FIG. 1 shows a schematic flowchart of the basic method for finishing a glass product according to embodiments;

Below, embodiments of the present invention will be discussed in detail referring to the enclosed figures. Here, same reference numbers are provided to objects having same or similar functions such that the description thereof is interchangeable and mutually applicable.

DETAILED DESCRIPTION OF ILLUSTRATIVE EMBODIMENTS

Figure 2:
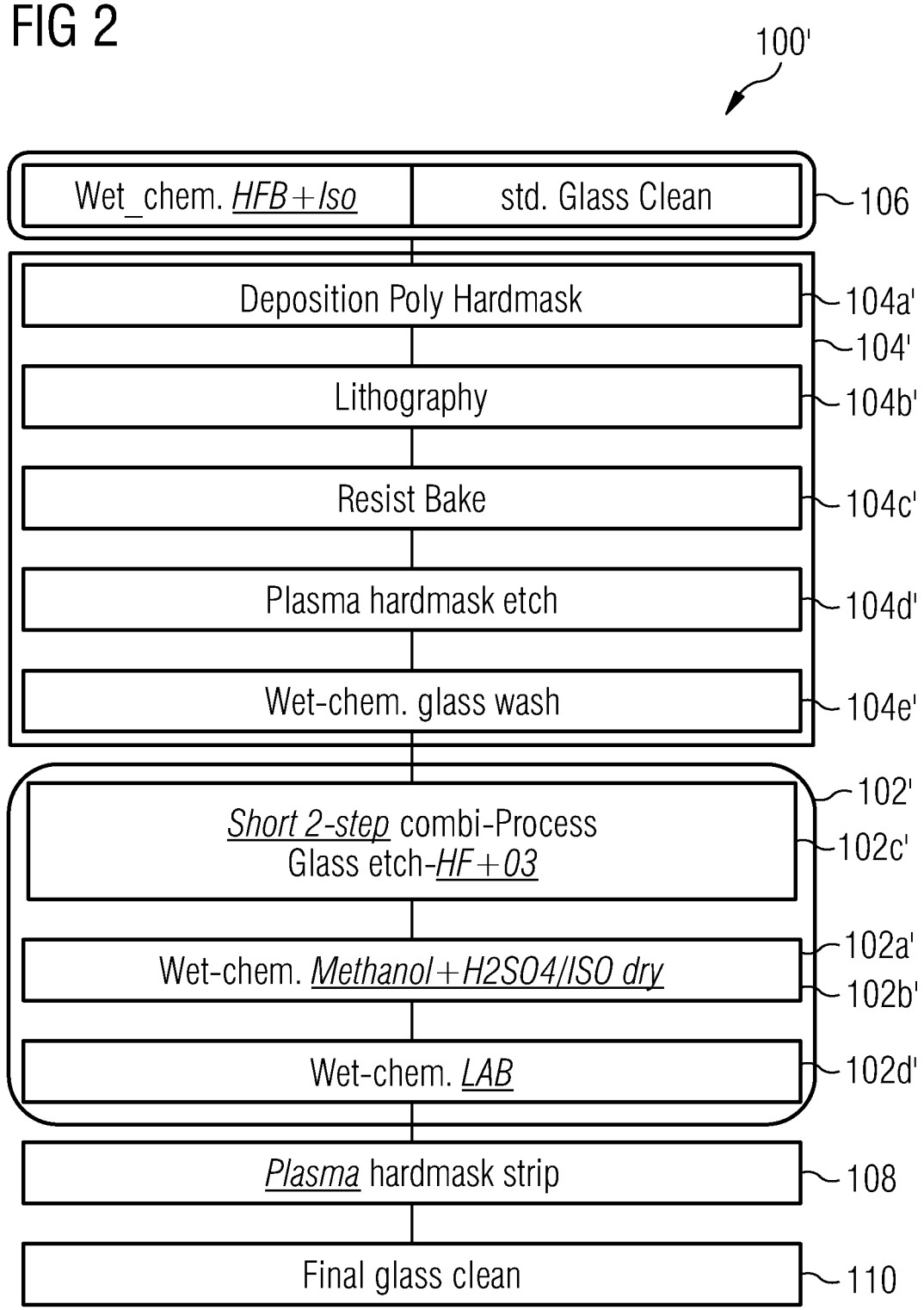
FIG. 2 shows a schematic flowchart of a method for manufacturing a glass substrate according to further embodiments.

FIG. 1 shows a method 100 for finishing a glass product 10 comprising a glass layer 12, like a glass substrate 12 of the glass product 10a. It should be noted that the glass product 10 may be a MEMS or LABS device or another electronic device being formed by a glass layer or comprising the glass layer, e.g., a device having a substrate and a glass layer like a PBSG*BPSG layer, arranged at its surface. The glass layer 12 may be a borosilicate glass or, a glass comprising boric oxide ($B_2O_3$) or in general another kind of boron. Before discussing the method for cleaning, the problems with regard to the boron will be discussed.

Boron is an important ingredient for a special type of glasses. However, the boron may cause problems for some applications, like medical applications or manufacturing applications. For example, in case of structuring glasses (e.g., float glasses, etc.) for the MEMS production, the step of etching the glass substrate or glass layer may cause a so-called leachate of ions, especially in case of wet-chemical etching. The solved or free ions tend to form hardly soluble reaction products. Thus, at the deposition of such reaction products remains at the surface of the glass layer 12. For example, boric acid, ammonium fluoride or PTFE may contaminate the surface of the glass layer 12. Typically, a three-stage cleaning process comprising wet-chemical resist and hard mask stripping may be performed after structuring in order to remove the deposition of the hardly soluble reaction products. However, this three-stage cleaning process is also not gentle and needs a long process time. The process time may cause further problems, e.g., problems within the glass layer (for example, up to depths of 100 nm), like chemical changes or like swelling.

Below, a cleaning procedure avoiding the above drawbacks, especially the drawbacks caused by the cleaning process will be discussed.

The improved cleaning process is illustrated by the flowchart of FIG. 1 showing the method 100, where the cleaning step is marked by the reference numeral 102. The cleaning step 102 comprises the basic substep of esterification 102a.

The esterification is performed using a medium 14, which may be brought into contact with the glass layer 12 using a sink or an automatic process (e.g., being based on a wet bench or a dispenser). The medium comprises an alcohol, like ethanol, isopropanol and/or preferably methanol (MeOH). Optionally, the medium may also comprise an acid, like $H_2SO_4$. The acid has the purpose to perform stabilization during the esterification 102a and additionally/or alternatively to perform catalysis of the chemical reaction of the esterification 102a.

In case the glass substrate or glass layer 12 gets in contact with the medium, the esterification begins in that way, that a chemical reaction of the alcohol and the boron deposited at the layer 12 starts. In detail, the esterification 102a may exemplarily be described by the following formula:

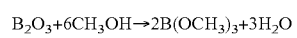

$$B_2O_3 + 6CH_3OH \rightarrow 2B(OCH_3)_3 + 3H_2O$$

Due to this esterification the boron and the alcohol form a reaction product which is volatile and easily soluble. A typical example for a reaction product is trimethyl borate. Due to the volatile trimethyl borate/reaction product which forms a linkage to the boron, the surface of the glass layer 12 is free of boron, or, in general the boric concentration at the surface is reduced (when compared to the boric concentration before cleaning 102).

According to further embodiments, the boric concentration within the near surface, i.e., after a depth of 100 nm or 50 nm or 200 nm may be reduced (e.g., by 50% or 75%) when compared to the boric concentration at the core of the glass layer. I.e., the cleaning 102 enables, according to further embodiments, to adjust the boric concentration at the near surface.

The cleaning 102 or especially the esterification 102a depends on previous parameters, like the mixture of the medium, the temperature and the process time. Preferred processed parameters will be discussed below, wherein it should be noted that also variations of the process parameters or combinations of the process parameters below are possible:

According to embodiments, the esterification 102a may be performed at room temperatures, i.e., at 20° C. or in general in a range between 15° C. and 25° C. or 5° C. and 50° C.

According to additional embodiments, the process time may be in a range between 15 seconds and 300 seconds on a range between 1 second and 500 seconds.

A further process parameter is a mixture of the alcohol and the further ingredients, like the acid. For example, the media may comprise at least 60% or 80% or preferably more than 95% of alcohol and approximately 1% of acid (or in general 0.1% to 10% acid).

According to a further embodiment, the step of cleaning 102 may comprise an optional step of drying 102b, which is performed after the esterification 102a.

According to another embodiment, the step of cleaning 102 may be combined with a step of glass etching 102c using HF, followed by, e.g., a resist strip with O3 before performing the esterification 102a.

Since the above-described cleaning procedure 102 is preferably applicable to manufacturing processes for MEMS devices or LABS devices which include a structuring, the cleaning 102 may be performed after structuring 104 as illustrated by the method 100. Here, the structuring 104 may comprise steps of lithography or additional steps, which will be discussed with respect to FIG. 2.

FIG. 2 shows a further flowchart of a method 100'. The method 100' comprises the structuring steps 104', the cleaning steps 102' and optionally an initial etching step 106 using wet-chemical HFB as well as further process steps afterwards likes plasma hardmask stripping 108 and final glass cleaning 110.

As illustrated, the structuring 104' may comprise one of or all of the steps out of a group comprising deposition poly hardmask 104a', lithography 104b', resist baking 104c', plasma hardmask etching 104d' and/or wet-chemical glass washing 104e'. These steps 104a' to 104e' are typical structuring steps, wherein dependent on the application, the steps or the order of the steps may vary.

The cleaning step 102' comprises the basic step of esterification 102a' which is combined with the iso-drying 102b'. Before this basic step 102a' the cleaning 102' comprises a short two-stage combi process of glass etching 102c'. After performing the esterification 102a' and drying 102b' a wet-chemical laboratory step 102d' may follow.

The method 100' is a typical structuring method for MEMS devices or general for devices using semiconductor technologies like displays or consumer electronics like mobile phones or LCD panels. Especially in fields of semiconductor technologies the cleaning 102' has the advantages that silicon oxide ($SiO_2$) and the glass surfaces like borofloat are not affected by the cleaning procedure 102', wherein the main goal, namely the removing of ions of boron may be achieved. Furthermore, other elements, like Si, Si3N4, GaN, SiC or metals, are also not affected. Therefore, the above discussed method 102 enables to clean structured glass devices such that further processes following afterwards, like anodic bond processes are not affected. Therefore, the manufacturing process like manufacturing process 100' or comparable manufacturing processes comprising the cleaning 102' enable a better yield.

Also, the esterification 102a' has been discussed in the context of an esterification using methanol and, preferably, acid as catalyst, it should be noted that the esterification may also be performed using other alcohol types like isopropanol or ethanol, wherein the alcohol types preferably have short chains.

Figure 3:
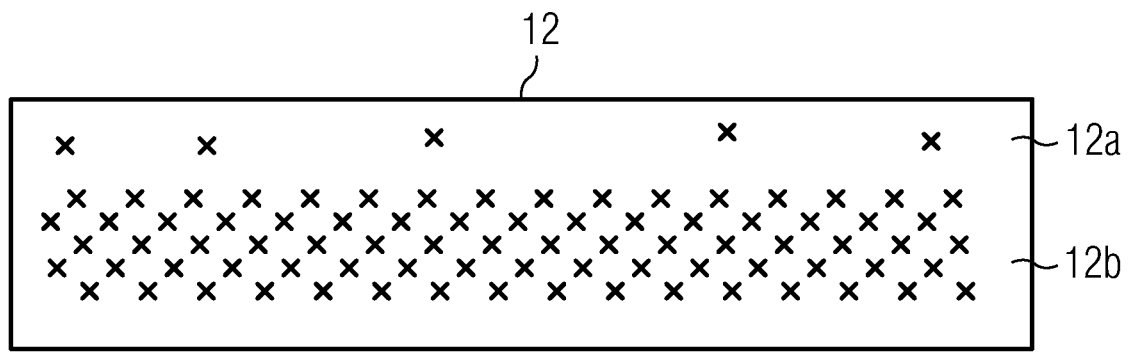
FIG. 3 shows a schematic block diagram of a glass product according to embodiments.

As indicated above, due to the cleaning procedure the ion concentration of boric concentration within the near surface, i.e., up to a depth of 250 nm or 100 nm or at least 50 nm beginning from the surface of the glass layer 12 may be adapted. Therefore, additional embodiments refer to a glass product as illustrated by FIG. 3.

The glass product 10 comprises a glass layer 12 or forms a glass layer 12, wherein the boric concentration within an area 12a near the surface significantly varies when compared to a boric concentration at the core 12b.

Although the above embodiments have been discussed with respect to glass devices for applications like MEMS or LABS or electronic devices it should be noted that the above discussed principles are also applicable to other devices, e.g., medical devices like an ampule/vial or in general to all types of glasses having boron as an ingredient, like potassium glasses or boric silicate glasses. Especially for such applications, the above discussed cleaning procedure may be used for removing the boron at least at the near surface area.

Here, it should be noted that the above described embodiments are illustrative, but do not define the scope of protection which should be defined by the claims below.

What is claimed is:

1. A method for finishing a glass product comprising a glass layer, the glass layer comprising boron, the method comprising:
cleaning the glass layer in order to remove boron at a surface of the glass layer, wherein the step of cleaning comprises a substep of esterification using a medium comprising an alcohol, wherein the method comprises a process step of structuring the glass layer comprising a substep of lithography before performing the step of cleaning.

2. A method according to claim 1, wherein the substep of esterification is performed as a chemical reaction of the alcohol and the boron.

3. A method according to claim 1, wherein the glass product comprises a product selected from the group consisting of MEMS devices, LABS devices, electronic devices, electronic devices having a borophosphorsilicate layer as glass layer, and medical devices.

4. The method according to claim 1, wherein the medium further comprises an acid.

5. The method according to claim 4, wherein the acid has a purpose to perform a stabilization of the medium and/or a catalyzation of a chemical reaction of the substep of esterification.

6. The method according to claim 4, wherein the acid has a percentage of 1% of the medium or a percentage within a range of 0.1% to 10% of the medium.

7. The method according to claim 1, wherein the alcohol comprises an alcohol selected from the group consisting of ethanol, isopropanol and MeOH and combinations thereof.

8. The method according to claim 1, wherein the alcohol comprises methanol.

9. The method according to claim 1, wherein the cleaning is performed such that a boric concentration of the glass layer is reduced at least up to 75% at least at a depth of 100 nm.

10. The method according to claim 1, wherein a process time of the cleaning lies within a range between 15 s and 300 s.

11. The method according to claim 1, wherein the substep of esterification is performed at a temperature lying within a temperature range between 5° C. and 50° C.

12. The method according to claim 1, wherein the cleaning is performed such that a boric concentration at a near surface of the glass layer is reduced by at least 75% up to a depth of 100 nm when compared to the boric concentration at a core of the glass layer.

13. The method according to claim 1, wherein the step of cleaning comprises a process substep of glass etching before performing the substep of esterification.

14. The method according to claim 1, wherein the step of cleaning comprises a process substep of drying using isopropanol after performing the substep of esterification.

15. The method according to claim 1, wherein the step of cleaning includes a process step of hard mask stripping after the substep of esterification.

16. The method according to claim 1, wherein the structuring comprises depositing of a hardmask, resist baking, plasma hardmask etching and/or wet-chemical glass washing.

17. The method according to claim 1, wherein the method comprises a process step of initial etching before performing the step of structuring.

18. A method for manufacturing a glass substrate that comprises boron, the method comprising:

structuring the glass substrate including performing a lithography step; and cleaning the glass substrate in order to remove boron at a near surface of the glass substrate up to a depth of 100 nm of the glass substrate, wherein the cleaning comprises esterification using a medium comprising more than 80% of MeOH and less than 5% of $H_2SO_4$.

19. A method for finishing a glass product comprising a glass layer, the glass layer comprising boron, the method comprising:

cleaning the glass layer in order to remove boron at a surface of the glass layer, wherein the step of cleaning comprises a substep of esterification using a medium comprising an alcohol, wherein the step of cleaning includes a process step of hard mask stripping after the substep of esterification.

* * * * *

UNITED STATES PATENT AND TRADEMARK OFFICE
CERTIFICATE OF CORRECTION

PATENT NO. : 9,963,381 B2  
APPLICATION NO. : 14/808965  
DATED : May 8, 2018  
INVENTOR(S) : David Baum et al.

Page 1 of 1

It is certified that error appears in the above-identified patent and that said Letters Patent is hereby corrected as shown below:

On the Title Page

Item (72) Inventors, Line 3, delete "Kagenfurt" and insert --Klagenfurt--.

Signed and Sealed this  
Seventeenth Day of July, 2018

Andrei Iancu  
*Director of the United States Patent and Trademark Office*